US012669995B1

(12) United States Patent
Menão Mochetti et al.

(10) Patent No.: US 12,669,995 B1
(45) Date of Patent: Jun. 30, 2026

(54) CONFIGURABLE MULTI-PROTOCOL DATA EXTRACTION DEVICE

(71) Applicant: Tractian Technologies Inc, Atlanta, GA (US)

(72) Inventors: Thiago Menão Mochetti, São Paulo (BR); Rafaella Silva Monti Souza, São Paulo (BR)

(73) Assignee: Tractian Technologies Inc, Atlanta, GA (US)

( * ) Notice: Subject to any disclaimer, the term of this patent is extended or adjusted under 35 U.S.C. 154(b) by 0 days.

(21) Appl. No.: 19/325,447

(22) Filed: Sep. 10, 2025

Related U.S. Application Data

(60) Provisional application No. 63/872,313, filed on Aug. 28, 2025.

(51) Int. Cl.
G08B 21/00 (2006.01)
G06F 9/22 (2006.01)
G06F 9/26 (2006.01)

(52) U.S. Cl.
CPC .............. G06F 9/226 (2013.01); G06F 9/267 (2013.01)

(58) Field of Classification Search
CPC ........ G06F 9/226; G06F 9/267; G06F 16/217; G06F 16/2423; G06F 16/284; G06F 17/40; E21B 47/135; G01V 1/226; G01V 1/247

USPC ......................... 340/679, 540, 644, 635, 500
See application file for complete search history.

(56) References Cited

U.S. PATENT DOCUMENTS

| | | | | |
|---|---|---|---|---|
| 9,430,507 | B2 * | 8/2016 | Stowe .................. | G06F 16/284 |
| 10,642,538 | B1 * | 5/2020 | MacLaren .......... | G06F 30/3308 |
| 2011/0060893 | A1 * | 3/2011 | Harrand ................. | G06F 13/10 |
| | | | | 712/225 |
| 2025/0159057 | A1 * | 5/2025 | Evans ..................... | H04W 4/38 |

* cited by examiner

*Primary Examiner* — Anh V La
(74) *Attorney, Agent, or Firm* — Cognition IP, P.C.; Edward Steakley; Saleh Kaihani

(57) ABSTRACT

Industrial machines can include internal or associated sensors, which can output one or more operational parameters of the industrial machine. Sensors can use a variety of communication protocols to output the machine data. A configurable, multi-protocol (CMP) device can include hardware and software functionality to interface with and communicate with a variety of sensors and their communication protocols. The CMP device can include a microcontroller, an interface selector, a connector with pinout, having connections. The microcontroller can include a variety of interfaces each dedicated to a communication protocol. The connections of the pinout can include channels. The interface selector can use a combination of relay positions to establish an electrical pathway between an interface of the microcontroller and one or more channels in the pinout.

20 Claims, 14 Drawing Sheets

1. V+ Positive Input or Output Power Supply
2. Channel 1
3. V- Reference and Power Supply
4. Channel 2
5. Reserved / NC

| Protocol | Channel 1 | Channel 2 |
|---|---|---|
| Analog | 0-10V | 4-20mA |
| Digital NPN | NPN or Dry Contact | NPN or Dry Contact |
| Digital PNP | PNP | PNP |
| RS-485 | Line A | Line B |
| I2C | SCL | SDA |

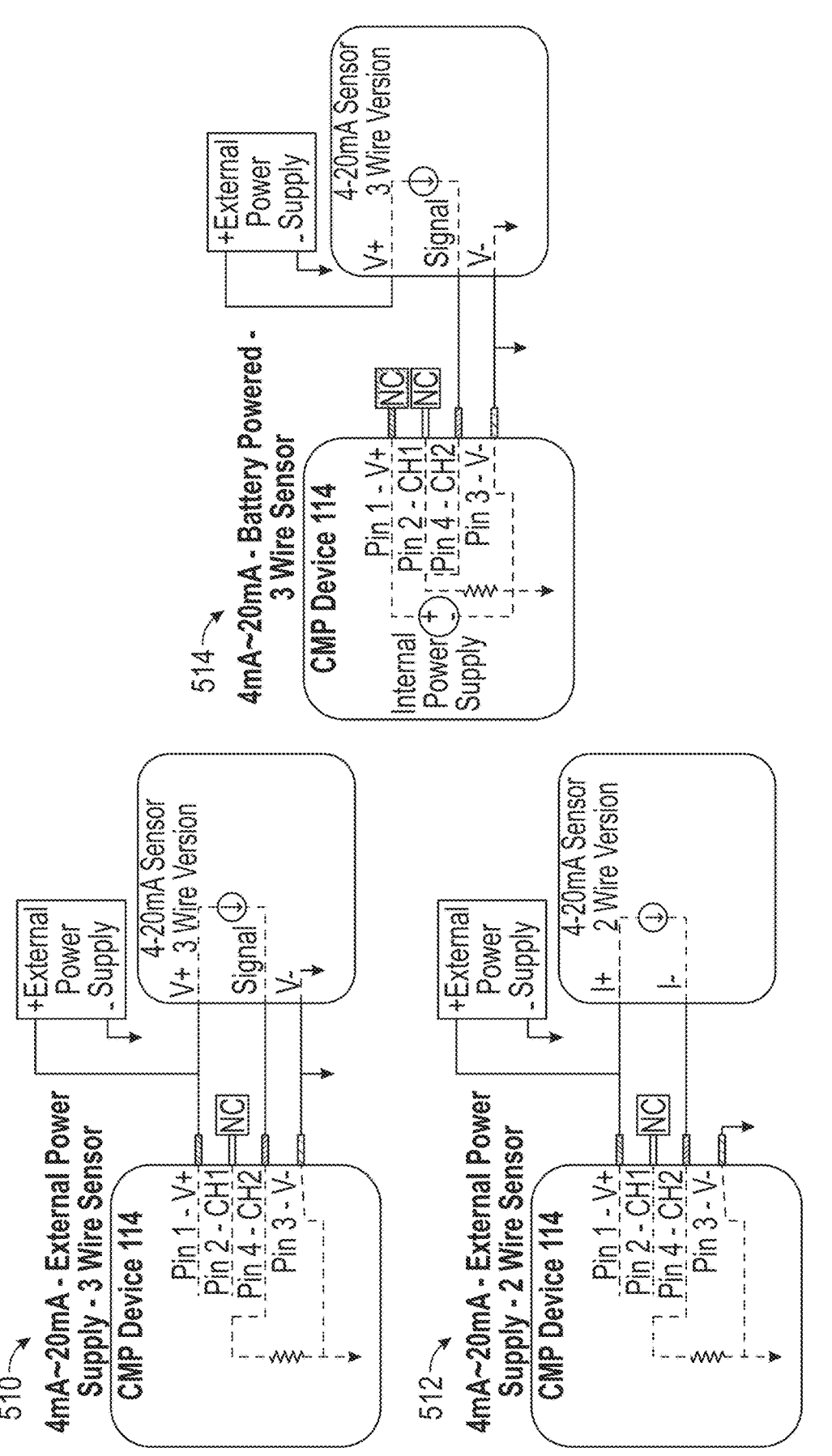
FIG. 5(Cont. 1)

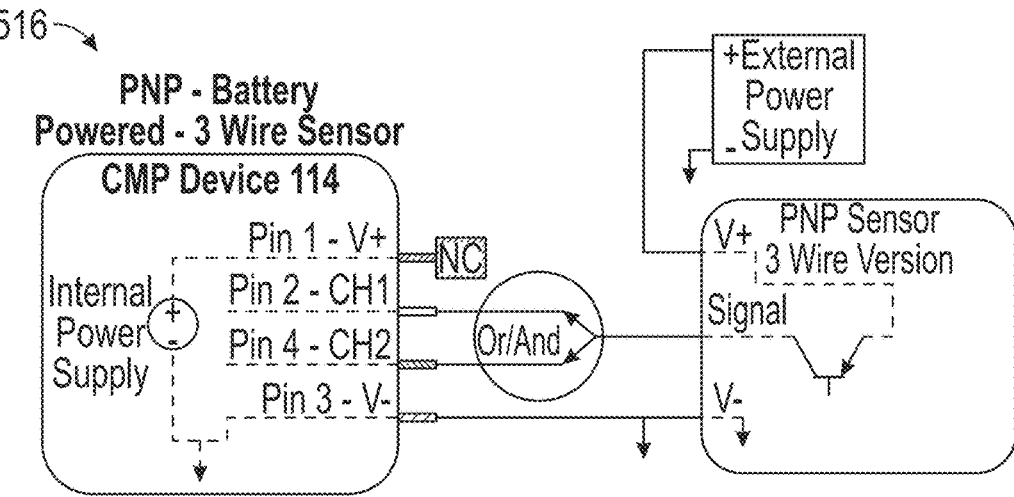
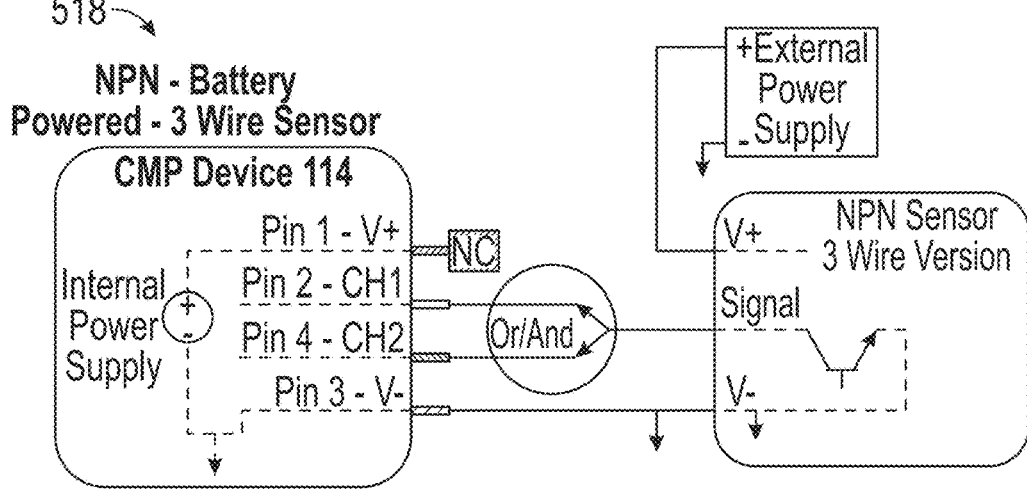
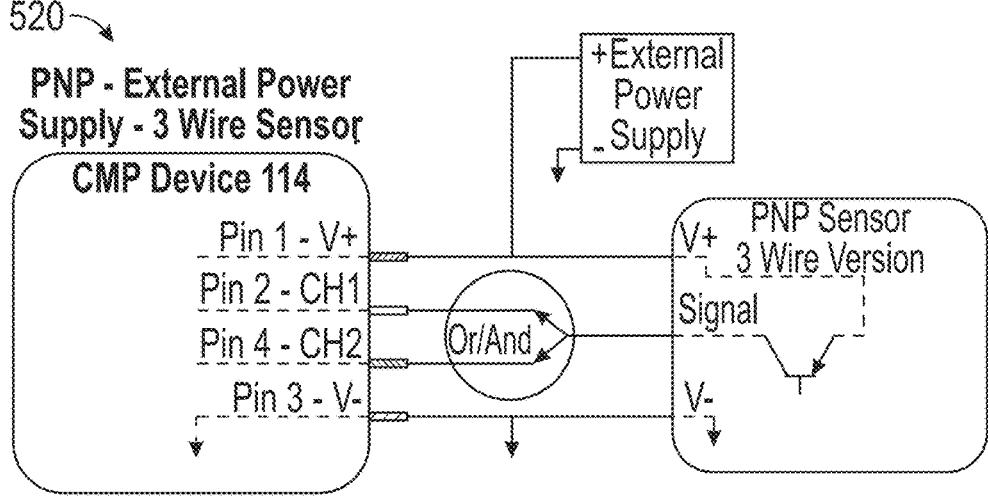
FIG. 5(Cont. 2)

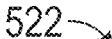
522
**Dry Contact - Power
Source - 2 Wire Sensor**
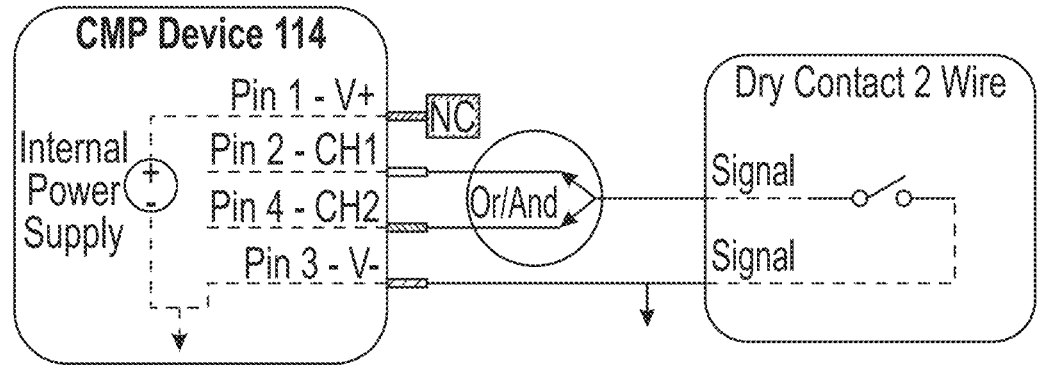
524
**Dry Contact - External Power
Supply - 2 Wire Sensor**
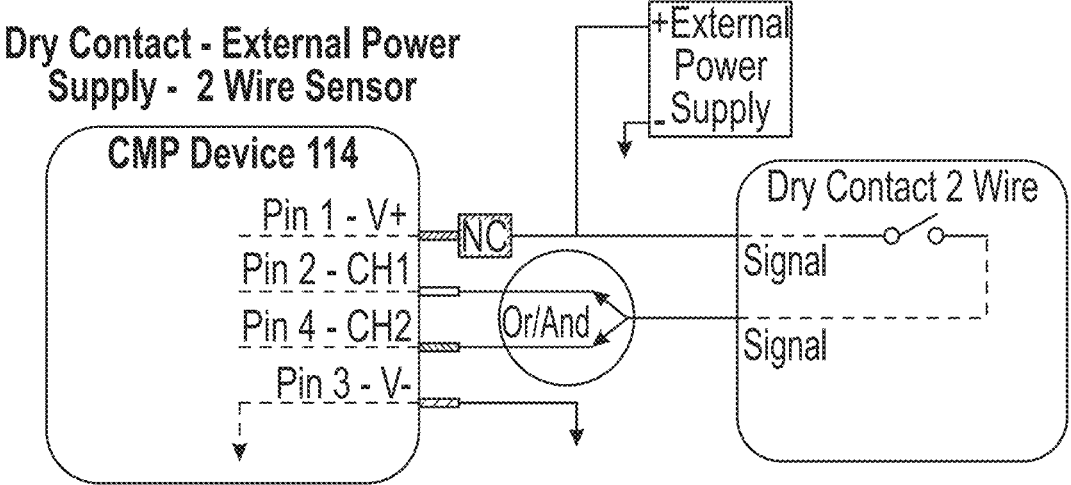
FIG. 5(Cont. 2)

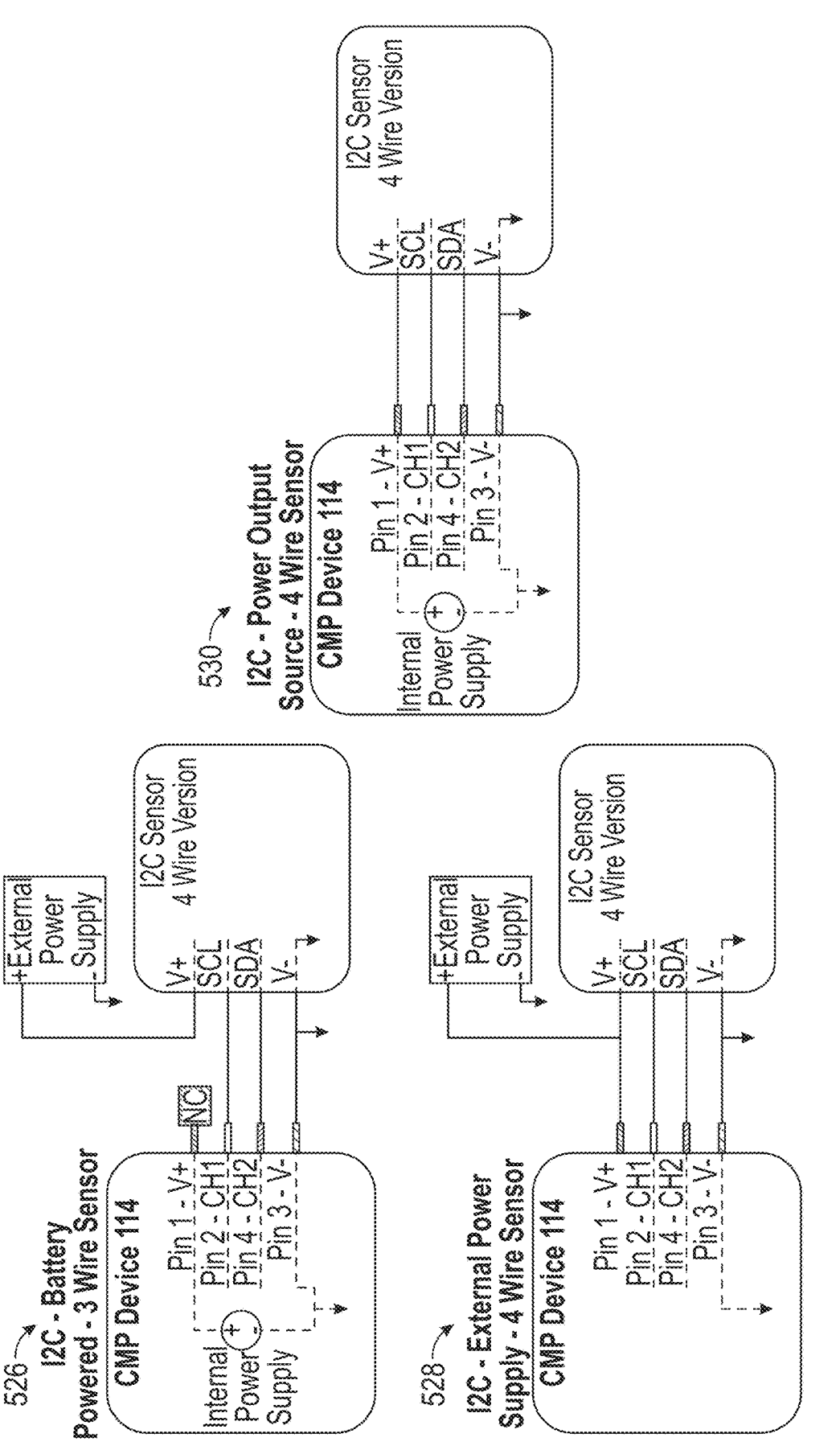
FIG. 5(Cont. 3)

CONFIGURABLE MULTI-PROTOCOL DATA EXTRACTION DEVICE

CROSS-REFERENCE TO RELATED APPLICATIONS

This application claims the benefit of priority to U.S. Provisional Application No. 63/872,313, filed on Aug. 28, 2025, which is hereby incorporated by reference in its entirety.

BACKGROUND

Field

This invention relates generally to wireless communication devices, and more particularly to multi-protocol communication devices.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Industrial machines can include build-in or associated monitoring or sensing devices, which can report on the operational parameters of the industrial machines. Examples can include multimeters, pressure gauges, volume gauges, flow sensors, contamination level meters, and many more. Some industrial machines can even include computers, as sensors that provide a wealth of machine data. The built-in or internal sensors of industrial machines can use a variety of communication protocols. Typically, an extractor device, compatible with their communication protocol is needed to read the machine data and perform other upstream processing on the machine data. Since various sensors can use different communication protocols, requiring different hardware and software in a corresponding extractor device, it can be difficult to deploy an appreciable number of extractor devices in an efficient way. The field of extractor devices can benefit from a configurable multi-protocol device, which can be manufactured as a single device in bulk quantities, and quickly customized for an industrial machine, via firmware commands. A challenge in developing a multi-protocol device is that to modify the protocol in the device, the in-device hardware changes can be unavoidable. Consequently, a robust configurable multi-protocol extractor device should be able to make internal hardware modification, via firmware commands.

SUMMARY

The appended claims may serve as a summary of this application. Further areas of applicability of the present disclosure will become apparent from the detailed description, the claims, and the drawings. The detailed description and specific examples are intended for illustration only and are not intended to limit the scope of the disclosure.

BRIEF DESCRIPTION OF THE DRAWINGS

These drawings and the associated description herein are provided to illustrate specific embodiments of the invention and are not intended to be limiting.

DETAILED DESCRIPTION

Figure 1:
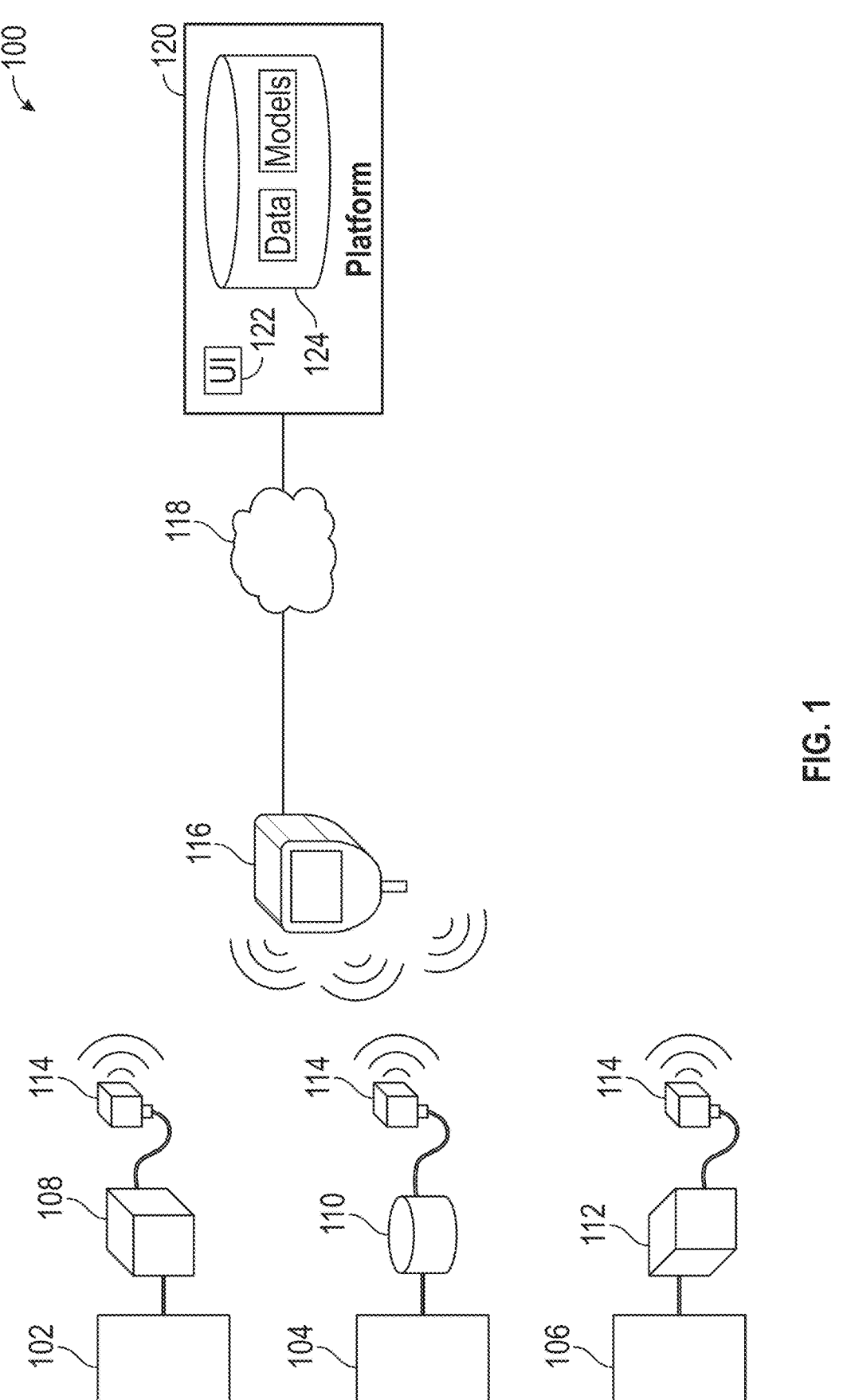
FIG. 1 illustrates an environment of deployment of a configurable multi-protocol (CMP) in an industrial environment.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements. Some of the embodiments or their aspects are illustrated in the drawings.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Various operational parameters of industrial machines can be monitored for providing diagnosis and maintenance services, and for other purposes. Parameter sensors or sensor monitors can be internal or external to the industrial machine. Internal or integrated sensors are part of the industrial machine and report on the operational parameters of the machine. External sensors are connected to and affixed to the industrial machine and can monitor various externally observable operation parameters of the industrial machine. Examples of internal or integrated monitors can include pressure sensors, flow sensors, level metric sensors, oil level sensors, oil purity sensors, water level sensors, resource consumption sensors, such as water or energy consumption sensors, and many more. Examples of external monitors can include those manufactured by Tractian Inc. of Atlanta, Georgia (+1 833-GET-TRAC), such as smartTrac®. Some applications of these externally affixable sensors can include vibration monitoring.

Both internal and external monitors can provide machine data for various purposes, such as maintenance and monitoring operations. Internal monitors in many industrial applications may operate on various communication protocols, hardware and software-wise. In other words, the internal sensors provide their output through a variety of communication protocols. The disparate communication protocols can make it difficult to deploy extraction devices with case. Lack of uniformity across one or multipole industrial environments can make it difficult to manufacture and deploy an extraction device, which can quickly be installed in the field and start seamlessly communicating with the internal sensors of the industrial machines in a plant. Furthermore, many internal sensors in part provide analog data, which can be expensive or infrastructurally invasive to transmit over large distances in an industrial plant. A wireless extraction device that can be internally configured, via firmware, to communicate with multiple protocols, can address several of the issues, outlined above. Such an extraction device can be manufactured in bulk quantities.

Individual extraction devices can then be configured, via firmware, depending on the field requirements, such as the industrial machine to which they are going to be communicating with, and shipped to a customer.

FIG. 1 illustrates an environment 100 of deployment of a configurable multi-protocol (CMP) device 114 in an industrial environment. Industrial machines 102, 104, 106, can each have their own unique internal sensors 108, 110, 112, respectively, with each sensor potentially using a distinct communication protocol. Example communication protocols can include analog communication (e.g. 0-10V or 4-20 mA), digital NPN, digital PNP, RS-485, and I2C. Existing industry solutions can include attaching a separate and distinct compatible extraction device to each sensor 108, 110, 112 to extract the machine data. The CMP device 114, on the other hand, can be configured, via firmware, with different internal hardware and software communication protocols to enable it to extract data from the various sensors 108, 110, 112. The CMP device 114 can include both an internal power supply (e.g., a battery) and also be able to be powered by an external power supply (e.g. 24V). The CMP devices 114 can include wireless communication components to transmit the machine data, extracted from the sensors 108, 110, 112 to one or more receivers 116. The receivers 116 can be installed in various locations in an industrial plant, and at distances compatible with robust wireless communication, depending on the wireless components, used in CMP devices 114. The receivers 116 can transmit the extracted machine data, via a network 118 to a cloud infrastructure, such as the platform 120. The platform 120 can include components, such as a user interface (UI) 122, and one or more servers 124. The servers 124 can include databases to store machine data or processed machine data, firmware updates, and various data, related to the operation of the platform 120 and the CMP devices 114. The servers 124 can also include one or more models (e.g., artificial intelligence (AI) models to process machine data), and provide diagnosis, and maintenance-related recommendations, regarding the industrial machines 102, 104, 106. Communication between the platform 120 and the CMP devices 114 can also go in the downstream direction. For example, the platform 120 can provide firmware updates to the CMP devices 114. Firmware update in the context of the overall purpose and goal of the operation of the CMP devices 114 can include modifying the extraction parameters, based on model output or user input, via UI 122, and/or based on the history of the extracted machine data to reconfigure the CMP devices 114 to extract better or more relevant data from the monitors 108, 110, 112.

Figure 2:
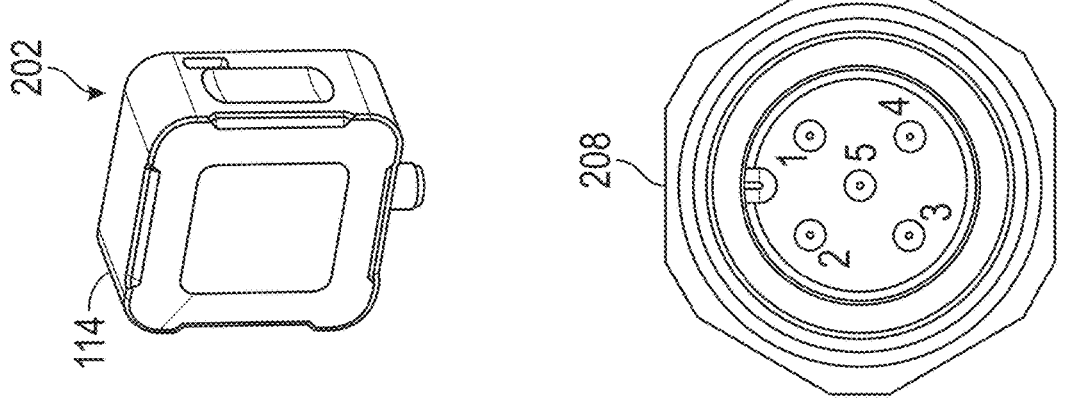
FIG. 2 illustrates various diagrams and views of the CMP device.

FIG. 2 illustrates various diagrams 200 and views of the CMP device 114. Diagram 202 shows a perspective view of an example CMP device 114. Diagram 204 illustrates various views of an example CMP device 114, from various angles. Diagram 206 illustrates an example hardware connector 206, implemented with an RJ45 connection, which can be used in CMP devices 114. pinout 208 of the connector 206 is also shown. The pinout 208 uses five connections in this example implementation. In other words, the CMP device 114 with the illustrated example implementation provides five pinout connections. Diagram 210 illustrates a view of an example usage of the CMP device 114 in the field, for example in an industrial plant. In this example, the CMP device 114 is attached to an industrial machine 212, locally and can electrically and physically couple to a sensor 214 of the industrial machine 212, via the connector 206 and via a short local cable 216. In this scenario, the local connection of the CMP device 114, via a short cable is advantageous for extracting analog data, without having to transmit the analog data over any distances in an industrial plant.

Figure 3:
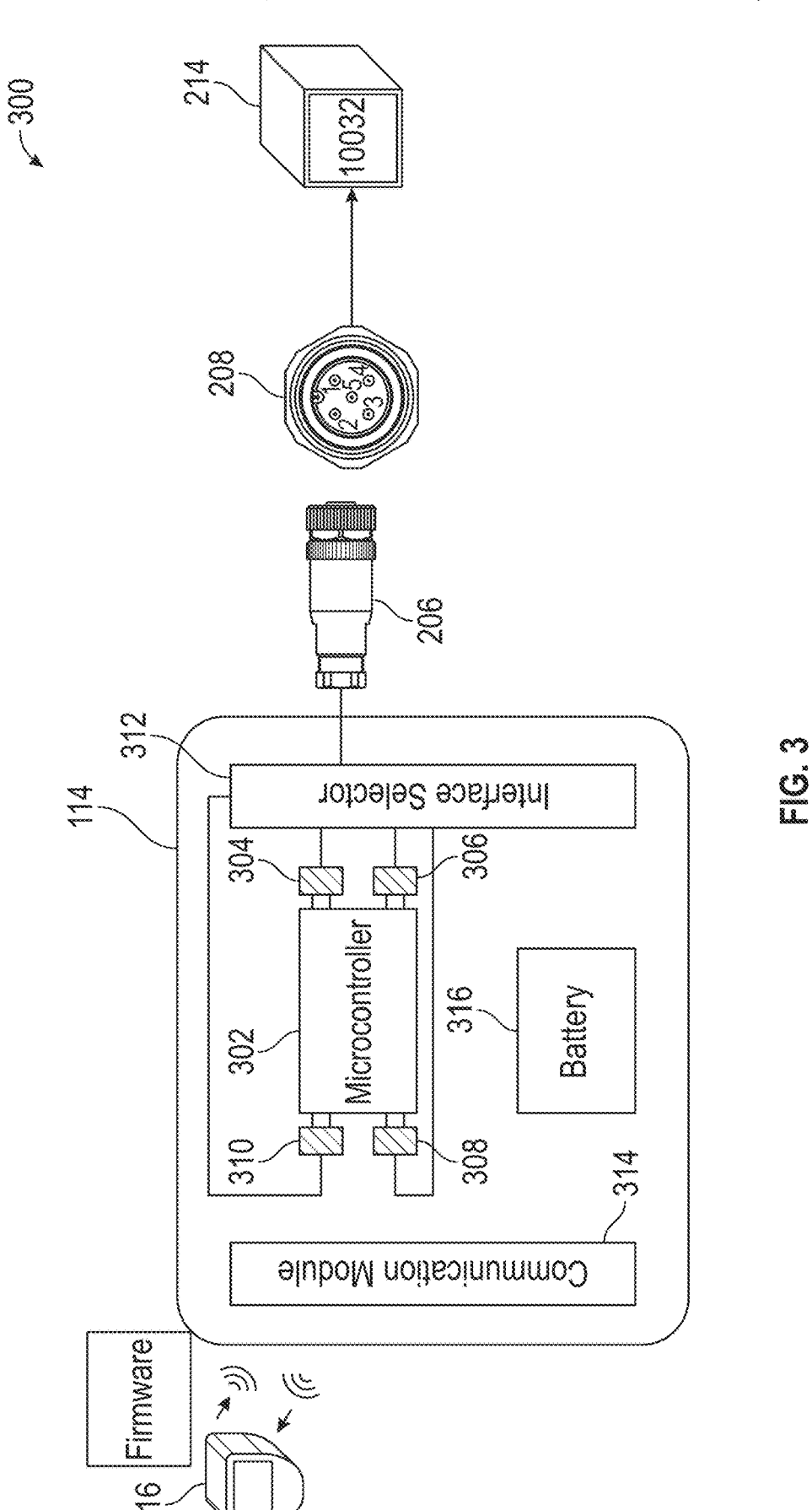
FIG. 3 is a diagram of some internal components of an example CMP device, connected with a connector and pinout to a sensor.

FIG. 3 is a diagram 300 of some internal components of an example CMP device 114, connected with connector 206 and pinout 208 to the sensor 214. The CMP device 114 can include a microcontroller 302. The microcontroller 302 manages the operations of the CMP device 114, including for example, executing firmware instructions communicated to the CMP device 114. The microcontroller 302 can include various communication interfaces 304, 306, 308, 310. Each communication interface of the microcontroller can include components corresponding to a selected communication protocol. For example, the communication interface 304 can include components corresponding to an analog communication protocol (e.g., 0-10V, or 4-20 mA). The communication interface 306 can include corresponding components to a digital NPN, or digital PNP communication protocol. The communication interface 308 can include components corresponding to an RS-485 communication protocol. The communication interface 310 can include components, corresponding to an I2C communication protocol. These are only example communication protocols. Other communication interfaces, corresponding to other communication protocols, can also be implemented via the microcontroller 302. The CMP device 114 can include an interface selector 312. The interface selector 312 can include the hardware components to generate a hardware electrical communication path between a communication interface 304, 306, 308, 310 and one or more connections of the pinout 206. The connector 206 and the pinout 208 provide an electrical and physical connection to the sensor 214. The CMP device 114 can include an internal power supply (e.g., the battery 316), but it can also be powered by an external power supply. The CMP device 114 can include a communication module 314 (e.g., 915 MHz wireless communication), which can enable back and forth wireless communication between the CMP device 114 and the receiver 116.

Figure 4:
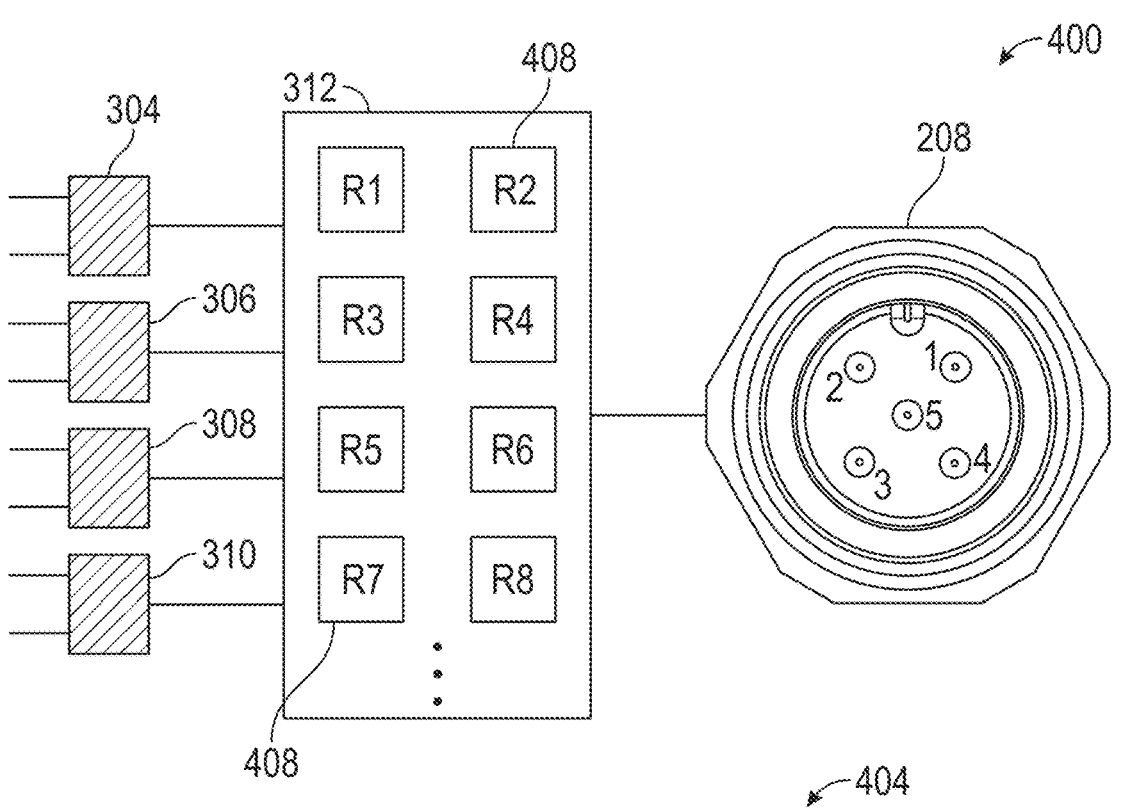
FIG. 4 illustrates a block diagram of some internal components of an interface selector, a diagram of the functions of the connections of the pinout, and a diagram of example communication interfaces and their corresponding channels in the pinout.

FIG. 4 illustrates a block diagram 400 of some internal components of the interface selector 312, a diagram 404 of the functions of the connections of the pinout 208, and a diagram 406 of example communication interfaces and their corresponding channels in the pinout 208. The interface selector 312 can include a plurality of relays 408. Relays can be implemented with switches, for example, electromagnetic switches that can open or close a switch when they receive a current. A combination of the positions of the relays 408 can create a physical and electrical path between a communication interface 304, 306, 308, 310 and one or more connections in the pinout 208. In some embodiments, the relays can be arranged in a tree structure, where a corresponding combination of the positions (open/close status) of the relays 408 can define a physical and electrical path between a communication interface 304, 306, 308, 310 and one or more connections of the pinout 208. Table (1) illustrates an example configuration and combination of positions of relays 408, corresponding to the communication interfaces. Each communication interface corresponds to a protocol that a sensor 214 might use.

TABLE (1)

| Comm interface (CI) and Protocol | Relay 1 | Relay 2 | Relay 3 | Relay 4 |
|---|---|---|---|---|
| CI 304 // Analog | OPEN | OPEN | OPEN | OPEN |
| CI 306 // NPN or PNP | OPEN | CLOSE | OPEN | OPEN |
| CI 308 // RS-485 | CLOSE | OPEN | CLOSE | OPEN |
| CI 310 // I2C | CLOSE | CLOSE | OPEN | OPEN |

The relay positions outlined in Table (1) are only one example implementation. Persons of ordinary skill in the art can arrange the relays 408 and the positions of the relays 408, relative to the communication interfaces 304, 306, 308, 310, differently. Many different implementations are possible. However, in each implementation, a combination of the relays 408 and/or the positions of the relays 408 create a physical and electrical path between a communication interface and one or more connections in the pinout 208. In some implementations, the firmware includes an instruction to activate a selected protocol. The microcontroller 302 searches for the selected protocol in the lookup table (1), finds a corresponding combination and/or positions of the relays 408, generates a corresponding current in the relays 408 to open and/or close the relays 408, based on the instructed protocol. The result is that an electrical and physical communication path between the selected communication interface and one or more connections of the pinout 208 will be generated.

Diagram 404 illustrates an example selected functionality of the connections of an pinout 208. A first connection ("connection 1") can be a positive power supply terminal (V+), a second connection ("connection 2") can be defined as a first channel ("channel 1"), a third connection ("connection 3") can be a negative power supply terminal (V−), which can also be used as a reference, a fourth connection ("connection 4") can be defined as a second channel ("channel 2"), and the fifth connection ("connection 5") can be reserved or not used. The power supply terminals of the pinout 208 can be used to power a sensor 214 and extract machine data. Some sensors 214 have their independent power supply and output machine data. Other sensors 214 may need to be powered by an external power source, typically from a data extractor device, before they can share machine data. The CMP device 114 can use its internal battery to power such sensors 214 and extract machine data.

Diagram 406 illustrates example protocols and their corresponding connections in the pinout 208. When the microcontroller 302 activates an interface by opening and closing a corresponding combination or positions of the relays 408, a first and/or a second channel in the pinout 208 physically and electrically connect to a communication interface 304, 306, 308, 310 of the microcontroller that have the corresponding components and configuration for the selected protocol. In the example shown in the diagram 406, selecting the analog protocol connects the first and second channels in the pinout 208 to an analog communication interface of the microcontroller 302. In this implementation, two distinct analog communication protocols become available at the pinout 208, the first channel can be used for analog communication, using 0-10V protocol and the second channel can be used for analog communication, using 4-20 mA. Some communication protocols can be implemented with just one channel, while others might use both channels. For example, digital NPN and PNP protocols use both channels. RS-485 also use both channels, the first channel for Line A, the second channel for Line B. In this example, the I2C protocol uses the first channel for clock and the second channel for data.

Figure 5:
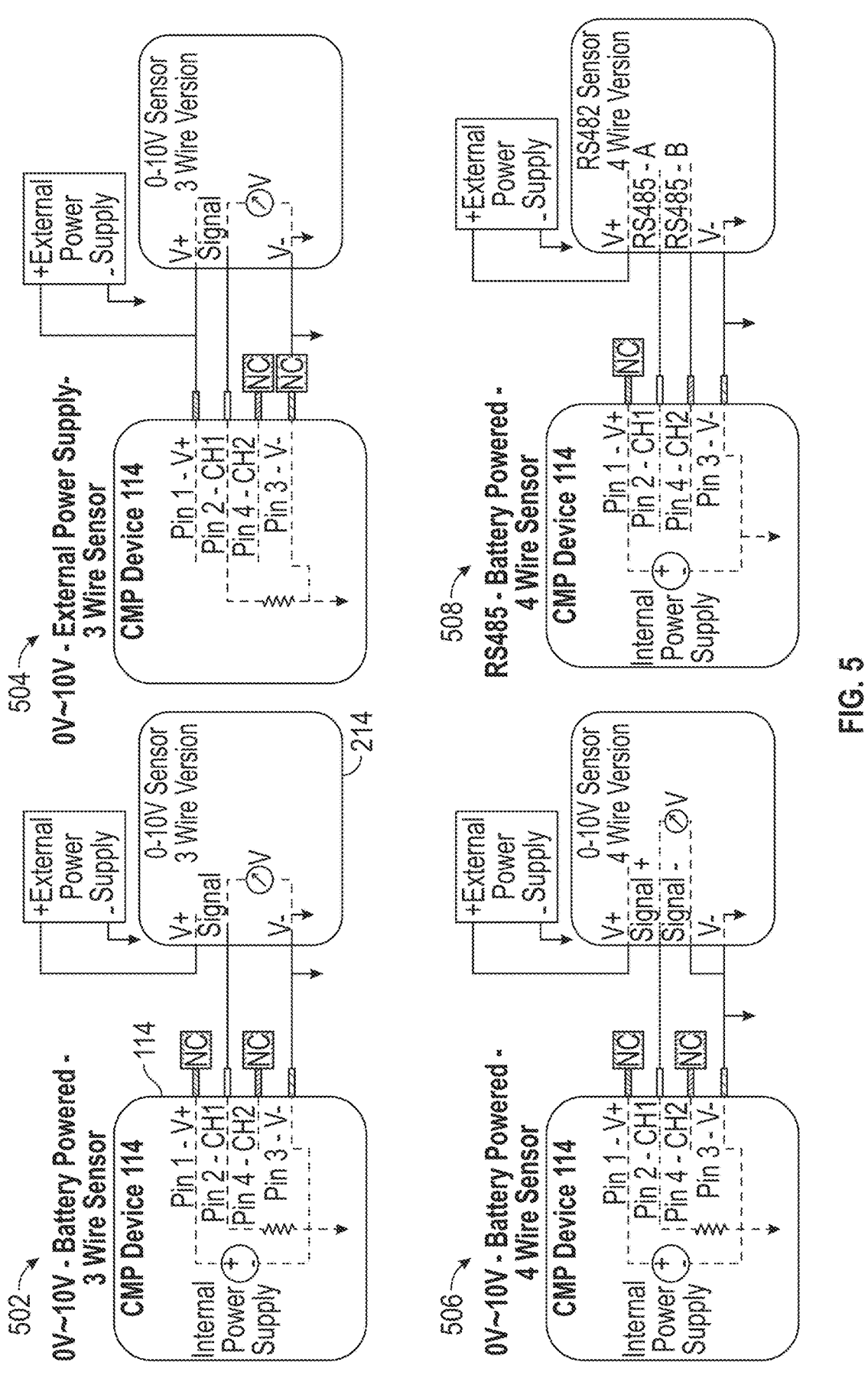
FIG. 5 illustrates diagrams of example sensors, having different communication protocol requirements, communicating with a CMP device, which is configured to communicate with those sensors.

The CMP device 114 can be used with various sensors 214, whether or not the sensor 214 is independently powered or needs to be powered by the CMP device 114 before it can share machine data. Furthermore, the ability to connect the channels of the pinout 208 to various protocols can provide for many potential configurations of the CMP device 114, and its ability to communicate with sensors 214 which may require different communication protocols. FIG. 5 illustrates diagrams of example sensors 214, having different communication protocol requirements, communicating with a CMP device 114, which is configured to communicate with the sensors 214. In each diagram the CMP device 114 is shown on the left and the sensor 214 is shown on the right. Some sensors have an independent power supply. Some sensors are powered by the CMP device 114. The industrial machines to which the sensors 214 are connected are not shown.

Diagram 502 shows a battery-powered CMP device 114 connected to a three-wire sensor, powered by an external power supply, and communicating with a 0-10V analog communication protocol. Diagram 504 illustrates a CMP device 114, powered by an external power supply, connected to a three-wire sensor, communicating using an analog 0-10V protocol. Diagram 506 illustrates a battery-powered CMP device 114, connected to a four-wire sensor 214, powered by an external power supply, and communicating with a 0-10V analog protocol. Diagram 508 illustrates a battery-powered CMP device 114, connected to a four-wire sensor 214, powered by an external power supply, and communicating with an RS-485 protocol.

Diagram 510 illustrates a CMP device 114, powered by an external power supply, connected to a three-wire sensor 214, and communicating with an analog 4-20 mA protocol. Diagram 512 illustrates a CMP device 214, powered by an external power supply, connected to a two-wire sensor 214, and communicating with an analog 4-20 mA protocol. Diagram 514 illustrates a battery-powered CMP device 214, connected to a three-wire sensor 214, powered by an external power supply, and communicating with an analog 4-20 mA protocol.

Diagram 516 illustrates a battery-powered CMP device 214, connected to a three-wire sensor 214, powered by an external power supply, and communicating with a digital PNP protocol. Diagram 518 illustrates a battery-powered CMP device 114, connected to a three-wire sensor 214, powered by an external power supply, and communicating with an digital NPN protocol. Diagram 520 illustrates a CMP device 114, powered by an external power supply, connected to a three-wire sensor, and communicating with a digital PNP protocol. Diagram 522 illustrates a battery-powered CMP device 214, connected to a two-wire sensor 214, communicating using dry contact. Diagram 524 illustrates a CMP device 214, powered by an external power supply, connected to a two-wire sensor 214, communicating using dry contact.

Diagram 526 illustrates a battery-powered CMP device 214, connected to an I2C sensor of a four-wire version, powered by an external power supply, and communicating using I2C protocol. Diagram 528 illustrates a CMP device 214, powered by an external power supply, connected to a four-wire I2C sensor of a four-wire version, and communicating using I2C protocol. Diagram 530 illustrates a battery-powered CMP device 214, connected to a four-wire I2C sensor of a four-wire version, and communicating using I2C protocol.

Not all components of the CMP device 214 are shown. For example, the CMP device 214 can include voltage regulators and DC to DC converters to step up or step down the voltage of its internal battery, to for example communicate with a sensor 214 that has a communication power requirement, different than the default battery voltage of a CMP device 114. For example, the default operating voltage of a CMP device can be approximately 1.8V, while some sensors 214 need to be powered by a voltage above that. Regulators or DC-DC converters of the CMP device 114 can step up the voltage of the internal battery to power and communicate with sensors requiring more than 1.8V.

Figure 6:
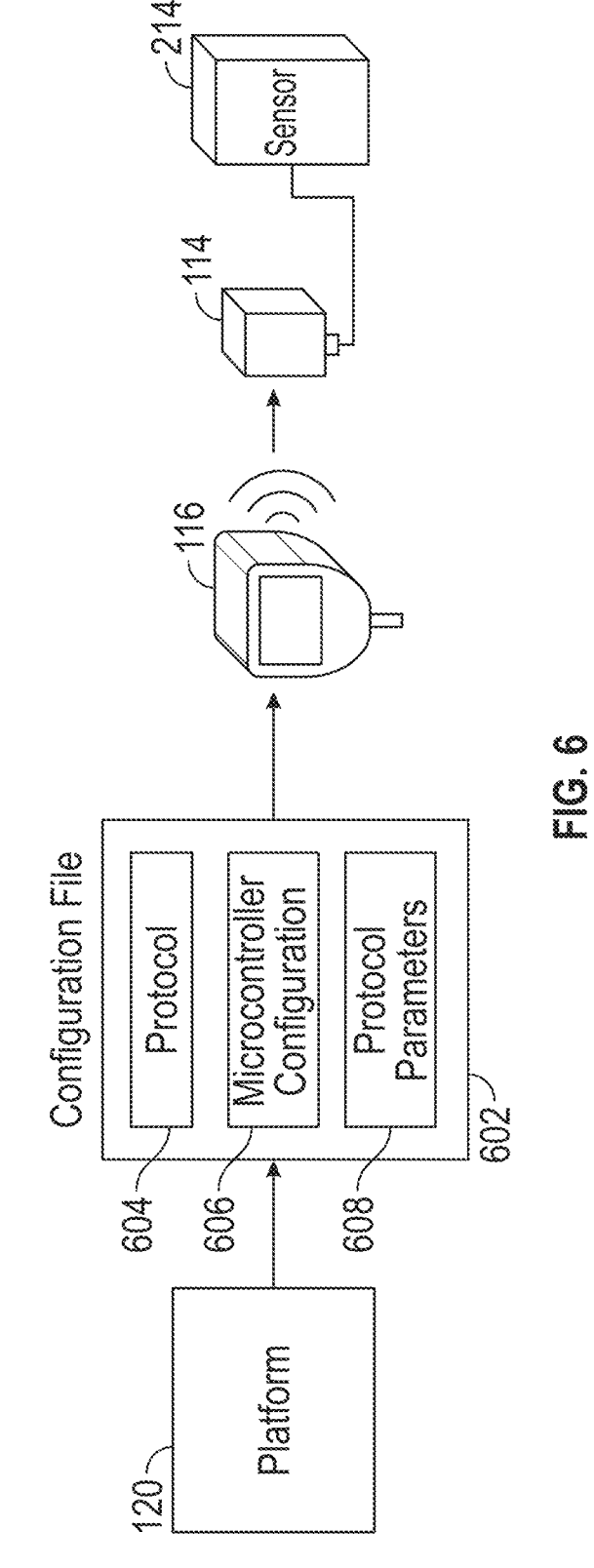
FIG. 6 illustrates a block diagram of dataflow to remotely instantiate or modify the data extraction parameters of a CMP device.

When a CMP device 114 is configured to connect with a sensor 214 and is deployed in the field, the platform 120 can send data extraction parameters to the DMP device 114. Example data extraction parameters can include, frequency, interval, bandwidth, wavelength, etc. FIG. 6 illustrates a block diagram 600 of dataflow to remotely instantiate or modify the data extraction parameters of a CMP device 114

(or a collection of them). The platform 120, automatically or via a user interface input, can generate a configuration file 602. The configuration file 602 can include a variety of configuration instructions, for various components of the CMP device 114, including the microcontroller 302. Configuration instructions can outline a communication protocol 604, microcontroller configuration 606, and communication protocol parameters 608. Protocol 604 can be a communication protocol, used by the sensor 214 to which the CMP device 114 is coupled. The microcontroller configuration 606 can include instructions to clear machine data sample buffer, disable or enable storage, format file system, reboot and/or similar commands to ready the microcontroller and its associated storage space to receive machine data and transmit them. Protocol parameters can include instructions to enable communication from the CMP device 114 to the sensor 214. The platform 120 transmits the configuration file 602 to the receiver 116 in an industrial plant. The receiver 116 transmits the configuration file 602 to the CMP device 114. The CMP device 114 receives the configuration file 602, via its communication module 314. The microcontroller 302 configures the CMP device 114, based on the configuration file, and extracts machine data, from the sensor 214, based on the parameters, specified in the configuration file 602.

Figure 7:
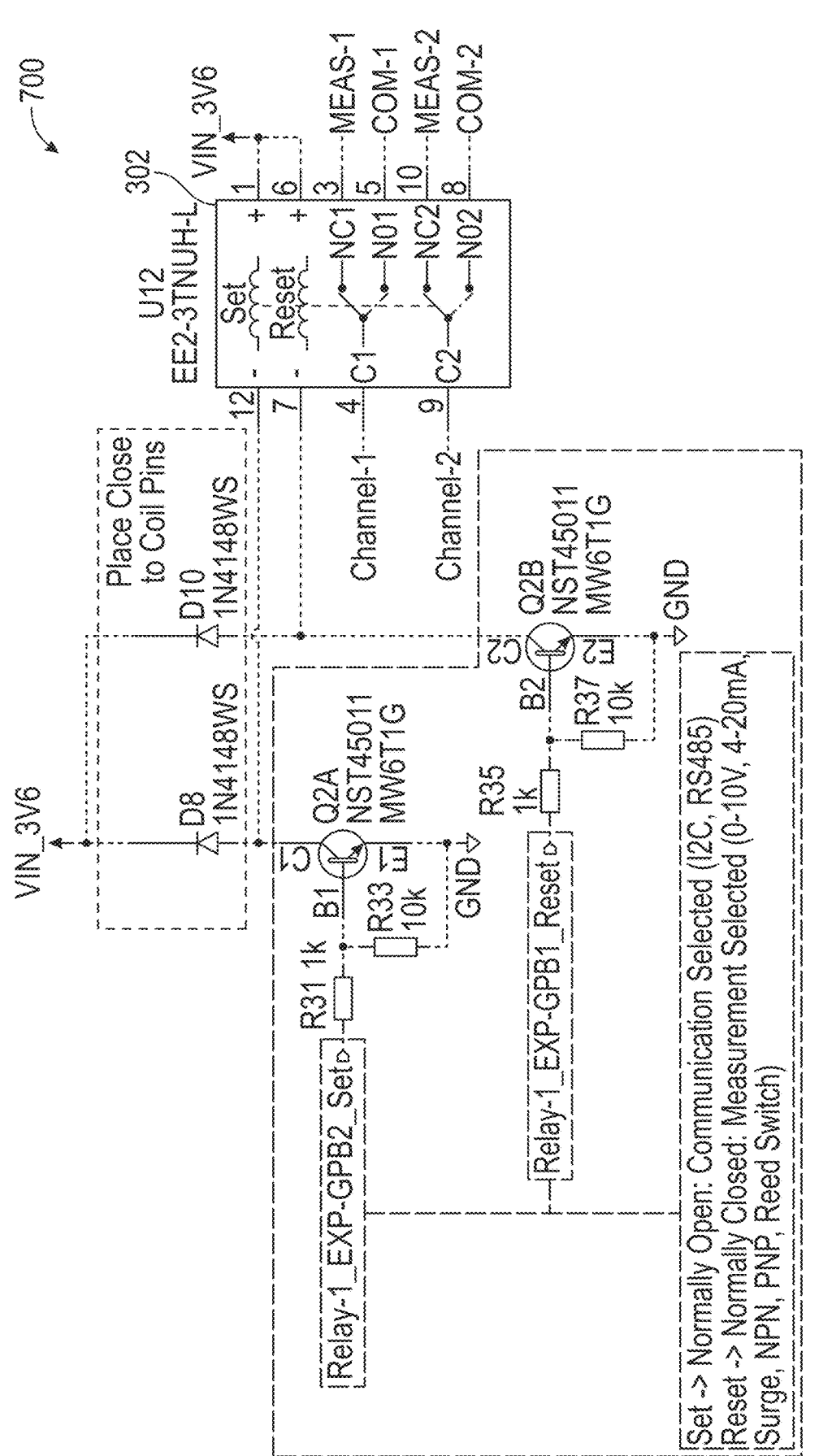
FIG. 7 illustrates a circuit diagram of potential relay combinations that can establish a physical and electrical path between an interface of a microcontroller and a pinout.
Figure 8:
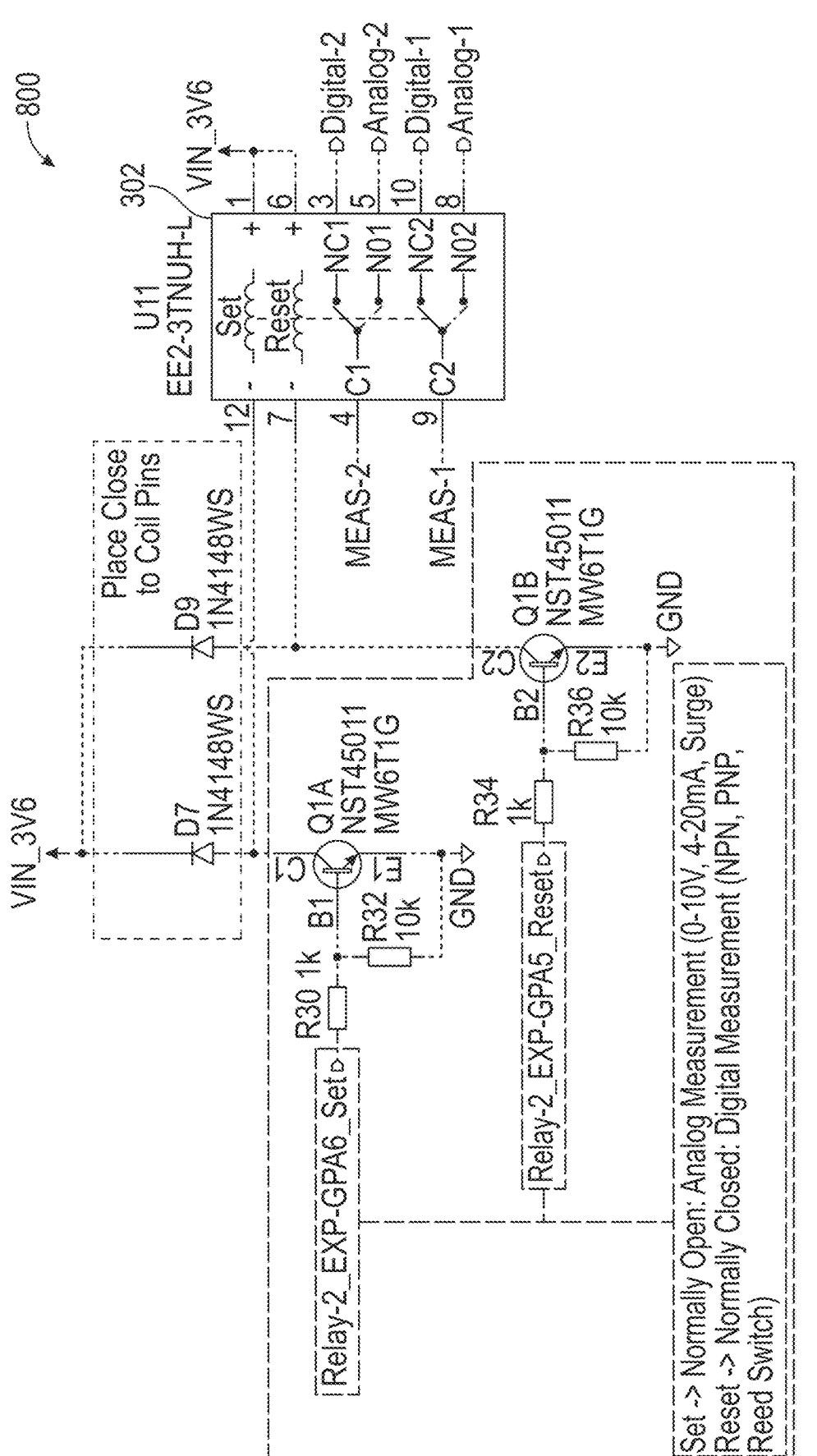
FIG. 8 illustrates another circuit diagram of potential relay combinations that can establish a physical and electrical path between an interface of a microcontroller and a pinout.
Figure 9:
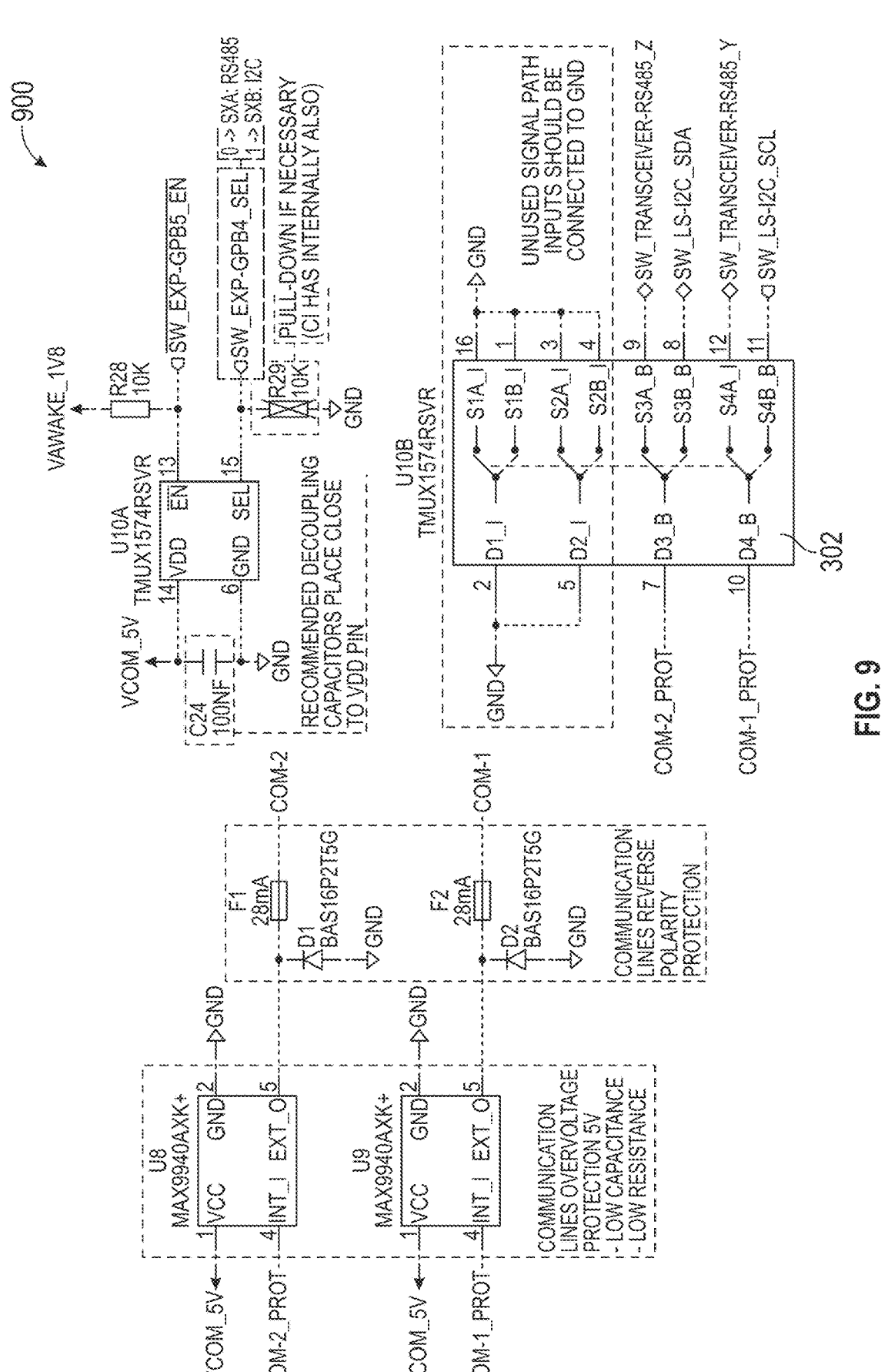
FIG. 9 illustrates another circuit diagram of potential relay combinations that can establish a physical and electrical path between an interface of a microcontroller and a pinout.

FIG. 7-9 illustrate circuit diagrams 700, 800 and 900 of potential relay combinations that can establish a physical and electrical path between an interface of the microcontroller 302 and the pinout 208. In some embodiments, the relays can have more than an open/close latch, reducing the overall number of relays that may be needed. The circuit diagrams 700-900 are provided as examples only. Person of ordinary skill in the art can envision other circuit diagrams and combination of relays, without departing from the spirit of the disclosed technology.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 10:
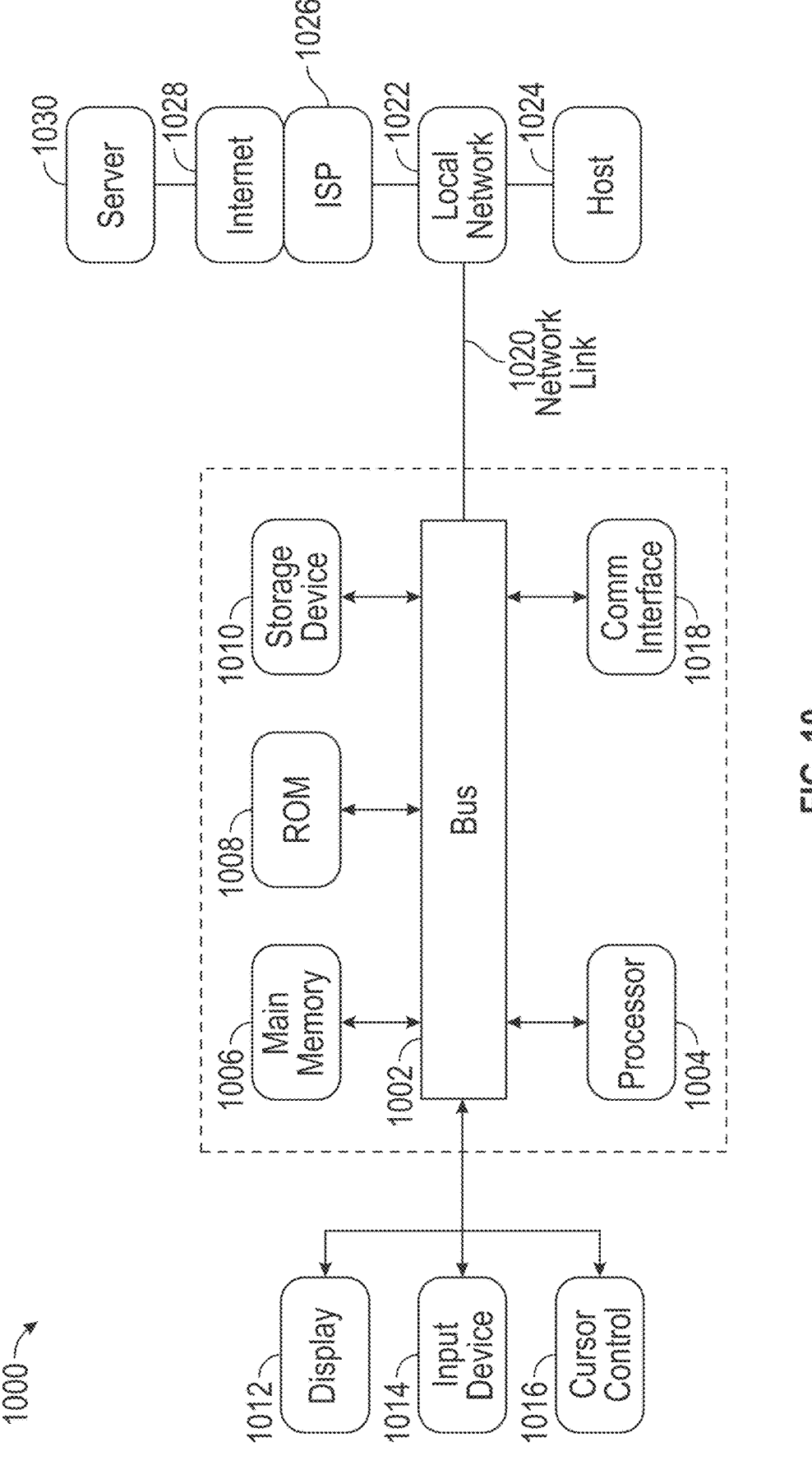
FIG. 10 illustrates an environment in which some embodiments may operate.

For example, FIG. 10 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touch-screen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

EXAMPLES

It will be appreciated that the present disclosure may include any one and up to all of the following examples.

Example 1: A configurable multi-protocol data extraction device comprising: a microcontroller, having a plurality of communication interfaces, each interface comprising components corresponding to hardware and software implementation of a sensor communication protocol; a connector, the connector comprising a pinout, the pinout comprising a plurality of connections, wherein the connections comprise a first channel and a second channel; an interface selector, comprising a plurality of relays, each relay comprising a switch, having an open and close position, wherein a unique combination of positions of relays corresponds to establishing a physical and electrical path between a communication interface of the microcontroller and one or both of the first and second channels of the pinout, wherein the microcontroller is configured to receive a firmware, the firmware comprising a selection of a sensor communication protocol, the microcontroller, upon receiving the selection of sensor communication protocol, configured to perform operations comprising: selecting, via the interface selector, a combination of positions of relays corresponding to the selection of the sensor communication protocol.

Example 2: The device of Example 1, further comprising a battery, wherein the pinout connections further comprise a positive and a negative power supply terminal, wherein a combination of the positions of the relays establishes a physical and electrical connection between the positive and negative power supply terminals to the battery.

Example 3: The device of any of Examples 1 and 2, further comprising a wireless communication module.

Example 4: The device of any of Examples 1-3, wherein the sensor comprises an industrial machine sensor, coupled to the industrial machine and outputting one or more operational parameters of the industrial machine.

Example 5: The device of any of Examples 1-4, wherein the communication protocols comprise one or more of analog communication protocols, digital PNP or NPN communication protocols, dry contact communication, RS-485 communication protocol, and I2C communication protocol.

Example 6: The device of any of Examples 1-5, wherein the pinout further comprises a positive or negative power supply terminal.

Example 7: The device of any of Examples 1-6, wirelessly in communication with a receiver, the receiver in communication with a platform, the platform comprising one or more processors configured to perform operations comprising: generating a configuration file, comprising a listing of the selected sensor communication protocol, microcontroller configuration file, and sensor communication protocol parameters.

Example 8: The device of any of Examples 1-7, wherein the parameters comprise data extraction parameters from the sensor.

Example 9: The device of any of Examples 1-8, wherein the microcontroller configuration file comprises instructions to configure the microcontroller buffer and storage to obtain machine data via the sensor, based on the parameters.

Example 10: The device of any of Examples 1-9, wherein the platform comprises a user interface, and one or more servers loaded with artificial intelligence models, configured to receive machine data from the microcontroller, via the receiver, and recommend diagnosis and/or maintenance of an industrial machine.

Example 11: A system comprising: a platform, in communication with a receiver, the receiver in wireless communication with a configurable, multi-protocol (CMP) device, the CMP device comprising: a wireless communication module; a microcontroller, having a plurality of interfaces, each corresponding to a sensor protocol; a battery; an interface selector; a connector, comprising a pinout, the pinout comprising a plurality of terminals; the wireless communication module of the CMP device, configured to receive a firmware, the firmware comprising a selected sensor protocol; the interface selector configured to establish an electrical pathway between one or more terminals of the pinout and an interface of the microcontroller comprising hardware and software components for the selected sensor protocol.

Example 12: The system of Example 11, wherein the platform is configured to generate a configuration file, comprising a listing of the selected sensor protocol, microcontroller instructions for extracting machine data from the sensor, and data extraction parameters.

Example 13: The system of any of Examples 11 and 12, wherein the interface selector comprises a plurality of relays, wherein relays in a tree structure arrange a plurality of electrical pathways between the terminals of the pinout and the interfaces of the microcontroller.

Example 14: The system of any of Examples 11-13, wherein the interface selector comprises a plurality of relays, wherein relays in a tree structure arrange a plurality of electrical pathways between the terminals of the pinout and the interfaces of the microcontroller, and a unique combination of the relay switch positions couples one or more terminals of the pinout to an interface of the microcontroller.

Example 15: The system of any of Examples 11-14, wherein the interface selector comprises a plurality of relays, wherein relays in a tree structure arrange a plurality of electrical pathways between the terminals of the pinout and the interfaces of the microcontroller, and a unique combination of the relay switch positions couples one or more terminals of the pinout to an interface of the microcontroller, wherein the microcontroller is configured to receive the firmware and generate a current in a combination of relays, opening and/or closing a combination of relay switches establishing the electrical pathway.

Example 16: The system of any of Examples 11-15, wherein the microcontroller scans a lookup table to find the combination of relays and/or relay positions for the selected protocol.

Example 17: The system of any of Examples 11-16, wherein the sensor communication protocols, comprise one or more of analog communication protocols, digital PNP or NPN communication protocols, dry contact communication, RS-485 communication protocol, and I2C communication protocol.

Example 18: The system of any of Examples 11-17, wherein the pinout comprises power supply terminals, wherein the CMP device is configurable to couple the power supply terminals with the battery.

Example 19: The system of any of Examples 11-18, wherein the terminals of the pinout comprise a first and a second channel, wherein the interface selector is configured to couple the first and second channels to an interface of the microcontroller, corresponding to the selected sensor protocol.

Example 20: The system of any of Examples 11-19, wherein the CMP device electrically couples with a sensor configured to communicate using the selected sensor protocol, wherein the CMP device is configured to extract machine data from the sensor, wherein the CMP device is configured to transmit the machine data to the receiver, wherein the receiver is configured to transmit the machine data to the platform, wherein the platform is configured to receive the machine data, wherein the platform, comprises one or more artificial intelligence models, configured to analyze the machine data and generate diagnosis and maintenance recommendations.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including, hard drives, floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects.

What is claimed is:

1. A configurable multi-protocol data extraction device comprising:
   a microcontroller, having a plurality of communication interfaces, each interface comprising components corresponding to hardware and software implementation of a sensor communication protocol;
   a connector, the connector comprising a pinout, the pinout comprising a plurality of connections, wherein the connections comprise a first channel and a second channel;
   an interface selector, comprising a plurality of relays, each relay comprising a switch, having an open and close position, wherein a unique combination of positions of relays corresponds to establishing a physical and electrical path between a communication interface of the microcontroller and one or both of the first and second channels of the pinout,
   wherein the microcontroller is configured to receive a firmware, the firmware comprising a selection of a sensor communication protocol, the microcontroller, upon receiving the selection of sensor communication protocol, configured to perform operations comprising:
      selecting, via the interface selector, a combination of positions of relays corresponding to the selection of the sensor communication protocol.

2. The device of claim 1, further comprising a battery, wherein the pinout connections further comprise a positive and a negative power supply terminal, wherein a combination of the positions of the relays establishes a physical and electrical connection between the positive and negative power supply terminals to the battery.

3. The device of claim 1, further comprising a wireless communication module.

4. The device of claim 1, wherein the sensor comprises an industrial machine sensor, coupled to the industrial machine and outputting one or more operational parameters of the industrial machine.

5. The device of claim 1, wherein the communication protocols comprise one or more of analog communication protocols, digital PNP or NPN communication protocols, dry contact communication, RS-485 communication protocol, and I2C communication protocol.

6. The device of claim 1, wherein the pinout further comprises a positive or negative power supply terminal.

7. The device of claim 1, wirelessly in communication with a receiver, the receiver in communication with a platform, the platform comprising one or more processors configured to perform operations comprising:
   generating a configuration file, comprising a listing of the selected sensor communication protocol, microcontroller configuration file, and sensor communication protocol parameters.

8. The device of claim 7, wherein the parameters comprise data extraction parameters from the sensor.

9. The device of claim 7, wherein the microcontroller configuration file comprises instructions to configure the microcontroller buffer and storage to obtain machine data via the sensor, based on the parameters.

10. The device of claim 7, wherein the platform comprises a user interface, and one or more servers loaded with artificial intelligence models, configured to receive machine data from the microcontroller, via the receiver, and recommend diagnosis and/or maintenance of an industrial machine.

11. A system comprising:
a platform, in communication with a receiver, the receiver in wireless communication with a configurable, multi-protocol (CMP) device,
the CMP device comprising:
a wireless communication module;
a microcontroller, having a plurality of interfaces, each corresponding to a sensor protocol;
a battery;
an interface selector;
a connector, comprising a pinout, the pinout comprising a plurality of terminals;
the wireless communication module of the CMP device, configured to receive a firmware, the firmware comprising a selected sensor protocol;
the interface selector configured to establish an electrical pathway between one or more terminals of the pinout and an interface of the microcontroller comprising hardware and software components for the selected sensor protocol.

12. The system of claim 11, wherein the platform is configured to generate a configuration file, comprising a listing of the selected sensor protocol, microcontroller instructions for extracting machine data from the sensor, and data extraction parameters.

13. The system of claim 11, wherein the interface selector comprises a plurality of relays, wherein relays in a tree structure arrange a plurality of electrical pathways between the terminals of the pinout and the interfaces of the micro-controller.

14. The system of claim 11,
wherein the interface selector comprises a plurality of relays,
wherein relays in a tree structure arrange a plurality of electrical pathways between the terminals of the pinout and the interfaces of the microcontroller, and a unique combination of the relay switch positions couples one or more terminals of the pinout to an interface of the microcontroller.

15. The system of claim 11,
wherein the interface selector comprises a plurality of relays,
wherein relays in a tree structure arrange a plurality of electrical pathways between the terminals of the pinout and the interfaces of the microcontroller, and a unique combination of the relay switch positions couples one or more terminals of the pinout to an interface of the microcontroller,
wherein the microcontroller is configured to receive the firmware and generate a current in a combination of relays, opening and/or closing a combination of relay switches establishing the electrical pathway.

16. The system of claim 15, wherein the microcontroller scans a lookup table to find the combination of relays and/or relay positions for the selected protocol.

17. The system of claim 11, wherein the sensor communication protocols, comprise one or more of analog communication protocols, digital PNP or NPN communication protocols, dry contact communication, RS-485 communication protocol, and I2C communication protocol.

18. The system of claim 11, wherein the pinout comprises power supply terminals, wherein the CMP device is configurable to couple the power supply terminals with the battery.

19. The system of claim 11, wherein the terminals of the pinout comprise a first and a second channel, wherein the interface selector is configured to couple the first and second channels to an interface of the microcontroller, corresponding to the selected sensor protocol.

20. The system of claim 11,
wherein the CMP device electrically couples with a sensor configured to communicate using the selected sensor protocol,
wherein the CMP device is configured to extract machine data from the sensor,
wherein the CMP device is configured to transmit the machine data to the receiver,
wherein the receiver is configured to transmit the machine data to the platform,
wherein the platform is configured to receive the machine data,
wherein the platform, comprises one or more artificial intelligence models, configured to analyze the machine data and generate diagnosis and maintenance recommendations.

* * * * *